(12) United States Patent
Kanjirathinkal et al.

(10) Patent No.: US 11,347,439 B2
(45) Date of Patent: May 31, 2022

(54) MANAGING I/O COMMUNICATIONS BASED ON TRANSCEIVER STATE

(71) Applicant: EMC IP Holding Company LLC, Hopkinton, MA (US)

(72) Inventors: Joseph G. Kanjirathinkal, Cary, NC (US); Peniel Charles, Bangalore (IN); Owen Crowley, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/078,461

(22) Filed: Oct. 23, 2020

(65) Prior Publication Data

US 2022/0129195 A1 Apr. 28, 2022

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/0613* (2013.01); *G06F 3/0635* (2013.01); *G06F 3/0653* (2013.01); *G06F 3/0683* (2013.01)

(58) Field of Classification Search
CPC .... G06F 3/0659; G06F 3/0604; G06F 3/0613; G06F 3/0635; G06F 3/0653
See application file for complete search history.

(56) References Cited

U.S. PATENT DOCUMENTS

| | | | |
|---|---|---|---|
| 10,972,145 B1* | 4/2021 | Klomsdorf | H01Q 21/28 |
| 2018/0219755 A1* | 8/2018 | Agarwal | H04L 67/1097 |
| 2018/0278484 A1* | 9/2018 | Puttagunta | H04L 49/555 |
| 2020/0183799 A1* | 6/2020 | Riedy | G06F 11/3034 |

* cited by examiner

*Primary Examiner* — Arpan P. Savla
*Assistant Examiner* — Edmund H Kwong
(74) *Attorney, Agent, or Firm* — Muirhead and Saturnelli, LLC

(57) ABSTRACT

A storage system may manage I/O communications between the storage system and other components on a storage network based on the state information of transceivers (e.g., SFPs) along I/O paths between the storage system and other network components. A storage system may send one or more queries to a switch of a data storage network. The query may request the state information of transceivers within any port on any I/O path through the switch between the storage system and another component on the storage network, for example, a host system or another storage system. The storage system may receive the requested transceiver state information in one or more responses, and manage I/O communications between the storage system and the other network component based on the received transceiver state information. The received state information may include, for each transceiver, an RX power level and/or a TX Power level for the transceiver.

20 Claims, 9 Drawing Sheets

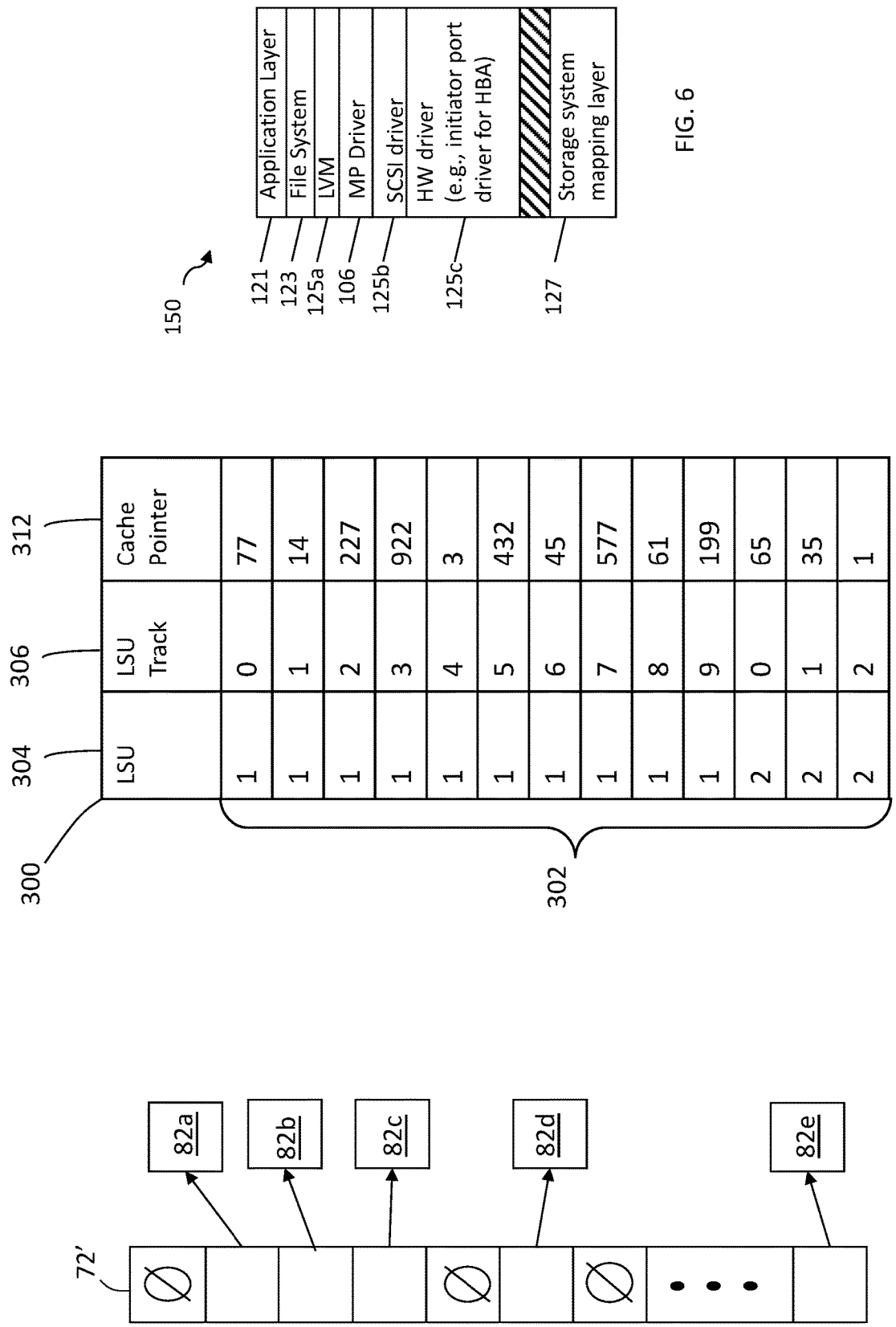

| LSU | Host Port | Front-End Port | Other Info |
|---|---|---|---|
| Dev0 | WWN12 | WWN45 | |
| Dev1 | WWN9 | WWN117 | |
| ... | | | |
| Devn | WWN77 | WWN6 | |

FIG. 8

| Initiator Port | Target Port | Other Info |
|---|---|---|
| WWW1 | WWW3 | |
| WWW7 | WWW8 | |
| ... | | |
| WWW9 | WWW2 | |

FIG. 9

| Network component | Interface port | Network component port | Priority value | Other Info |
|---|---|---|---|---|
| 1 | WWN12 | WWN211 | | |
| 1 | WWN9 | WWN990 | | |
| ... | | | | |
| 20 | WWN77 | WWN33 | | |

FIG. 10

MANAGING I/O COMMUNICATIONS BASED ON TRANSCEIVER STATE

BACKGROUND

Technical Field

This application generally relates to data storage systems, and more particularly to a data storage system detecting and communicating port transceiver state information on a storage network and managing I/O communications based on such port transceiver state information.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switch and storage system over which I/O operations between an application and storage device may be communicated may be considered an I/O path between the application and the storage device. It should be appreciated that other combinations of components of a storage network, for example, two or more storage systems, also may be coupled together by one or more switches. Thus, more generically, the one or more combinations of components of a first network component, switch and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method is performed for a data storage network including a storage system, a switch and one or more other network components. The method includes: for a first network component of the one or more other network components, sending at least one query from the storage system to the switch, the query requesting, for each of a first plurality of ports on one or more I/O paths that include the switch between the storage system and the first network component, state information about a state of a transceiver included within the port; receiving at least one response to the at least one query, the at least one response including, for each of the first plurality of the ports, the state information of the transceiver included within the port; and managing I/O communications between the storage system and the first network component based on the state information. The state information may include, for each transceiver, a measured receiving power and/or a measured transmitting power of the transceiver, and the managing of I/O communications may include: for each transceiver, performing at least one comparison, the at least one comparison including comparing the measured receiving power to a predefined receiving power threshold and/or comparing the measured receiving power to a predefined receiving power threshold, and managing the I/O communications based at least in part on the at least one comparison. There may be a plurality of I/O paths between the storage system and the first network component, each I/O path including two or more of the first plurality of ports, where the managing of I/O information between the storage system may include selecting an I/O path from among the plurality of I/O paths for I/O communications based at least in part on the at one comparison performed for each transceiver included within the respective two or more ports included in each of the plurality of I/O paths. The at least one query may request, for each of a second plurality of ports, including the first plurality of ports, between the storage system and a plurality of the one or more network components, including the first network component, state information about a state of a transceiver included within the port, where the at least one response may include, for each of second plurality of the ports, the state information of the transceiver included within the port, and where managing I/O communications between the storage system and the first network component may include determining that at least one of the plurality of I/O paths are between the storage system and the first network component, wherein the selected I/O path is selected among the at least one I/O path. The sending of the at least one query may be repeated according to a predefined schedule resulting in repeatedly receiving at least one response, respectively, in response to the repeated at least one query, where I/O communications between the storage system and the first network component may be managed based on the state information included in the repeatedly received at least one response. There may be a plurality of I/O paths between the storage system and the first network component, where the managing of I/O communications between the storage system and the first network component may include preventing I/O communications from being sent on at least one I/O path from among the plurality of I/O paths based at least in part on the state information for each of the first plurality of the ports. The other network component may be another data storage system. The state information may be values for small form-factor pluggable Read Diagnostic Parameters in accordance with a Fibre Channel specification.

In another embodiment of the invention, a data storage system is provided for a data storage network including the storage system, a switch and one or more other network components. The data storage system includes executable logic that implements a method including: for a first network component of the one or more other network components, sending at least one query from the storage system to the switch, the query requesting, for each of a first plurality of ports on one or more I/O paths that include the switch between the storage system and the first network component, state information about a state of a transceiver included within the port; receiving at least one response to the at least one query, the at least one response including, for each of the first plurality of the ports, the state information of the transceiver included within the port; and managing I/O communications between the storage system and the first network component based on the state information. The state information may include, for each transceiver, a measured receiving power and/or a measured transmitting power of the transceiver, and the managing of I/O communications may include: for each transceiver, performing at least one comparison, the at least one comparison including comparing the measured receiving power to a predefined receiving power threshold and/or comparing the measured receiving power to a predefined receiving power threshold, and managing the I/O communications based at least in part on the at least one comparison. There may be a plurality of I/O paths between the storage system and the first network component, each I/O path including two or more of the first plurality of ports, where the managing of I/O information between the storage system may include selecting an I/O path from among the plurality of I/O paths for I/O communications based at least in part on the at one comparison performed for each transceiver included within the respective two or more ports included in each of the plurality of I/O paths. The at least one query may request, for each of a second plurality of ports, including the first plurality of ports, between the storage system and a plurality of the one or more network components, including the first network component, state information about a state of a transceiver included within the port, where the at least one response may include, for each of second plurality of the ports, the state information of the transceiver included within the port, and where managing I/O communications between the storage system and the first network component may include determining that at least one of the plurality of I/O paths are between the storage system and the first network component, where the selected I/O path is selected among the at least one I/O path. The sending of the at least one query may be repeated according to a predefined schedule resulting in repeatedly receiving at least one response, respectively, in response to the repeated at least one query, and I/O communications between the storage system and the first network component may be managed based on the state information included in the repeatedly received at least one response. There may be a plurality of I/O paths between the storage system and the first network component, where the managing of I/O communications between the storage system and the first network component may include preventing I/O communications from being sent on at least one I/O path from among the plurality of I/O paths based at least in part on the state information for each of the first plurality of the ports. The state information may be values for small form-factor pluggable Read Diagnostic Parameters in accordance with a Fibre Channel specification.

In another embodiment of the invention, computer-readable media is provided for a data storage network including a storage system, a switch and one or more other network components. The computer-readable media has software stored thereon, the software including: executable code that, for a first network component of the one or more other network components, sending at least one query from the storage system to the switch, the query requesting, for each of a first plurality of ports on one or more I/O path that include the switch between the storage system and the first network component, state information about a state of a transceiver included within the port; executable code that receives at least one response to the at least one query, the at least one response including, for each of the first plurality of the ports, the state information of the transceiver included within the port; and executable code that manages I/O communications between the storage system and the first network component based on the state information. The state information may include, for each transceiver, a measured receiving power and/or a measured transmitting power of the transceiver, and wherein the managing of I/O communications may include: for each transceiver, performing at least one comparison, the at least one comparison including comparing the measured receiving power to a predefined receiving power threshold and/or comparing the measured receiving power to a predefined receiving power threshold, and managing the I/O communications based at least in part on the at least one comparison. There may be a plurality of I/O paths between the storage system and the first network component, each I/O path including two or more of the first plurality of ports, where the managing of I/O information between the storage system may include selecting an I/O path from among the plurality of I/O paths for I/O communications based at least in part on the at one comparison performed for each transceiver included within the respective two or more ports included in each of the plurality of I/O paths. The at least one query may request, for each of a second plurality of ports, including the first plurality of ports, between the storage system and a plurality of the one or more network components, including the first network component, state information about a state of a transceiver included within the port, and the at least one response may include, for each of second plurality of the ports, the state information of the transceiver included within the port, and managing I/O communications between the storage system and the first network component may include determining that at least one of the plurality of I/O paths are between the storage system and the first network component, wherein the selected I/O path is selected among the at least one I/O path. There may be a plurality of I/O paths between the storage system and the first network component, where the managing of I/O communications between the storage system and the first network component may include preventing I/O communications from being sent on at least one I/O path from among the plurality of I/O paths based at least in part on the state information for each of the first plurality of the ports.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 10 is a block diagram illustrating an example of a data structure for maintaining I/O path priority values, according to embodiments of the invention;

DETAILED DESCRIPTION OF EMBODIMENTS

Figure 1:
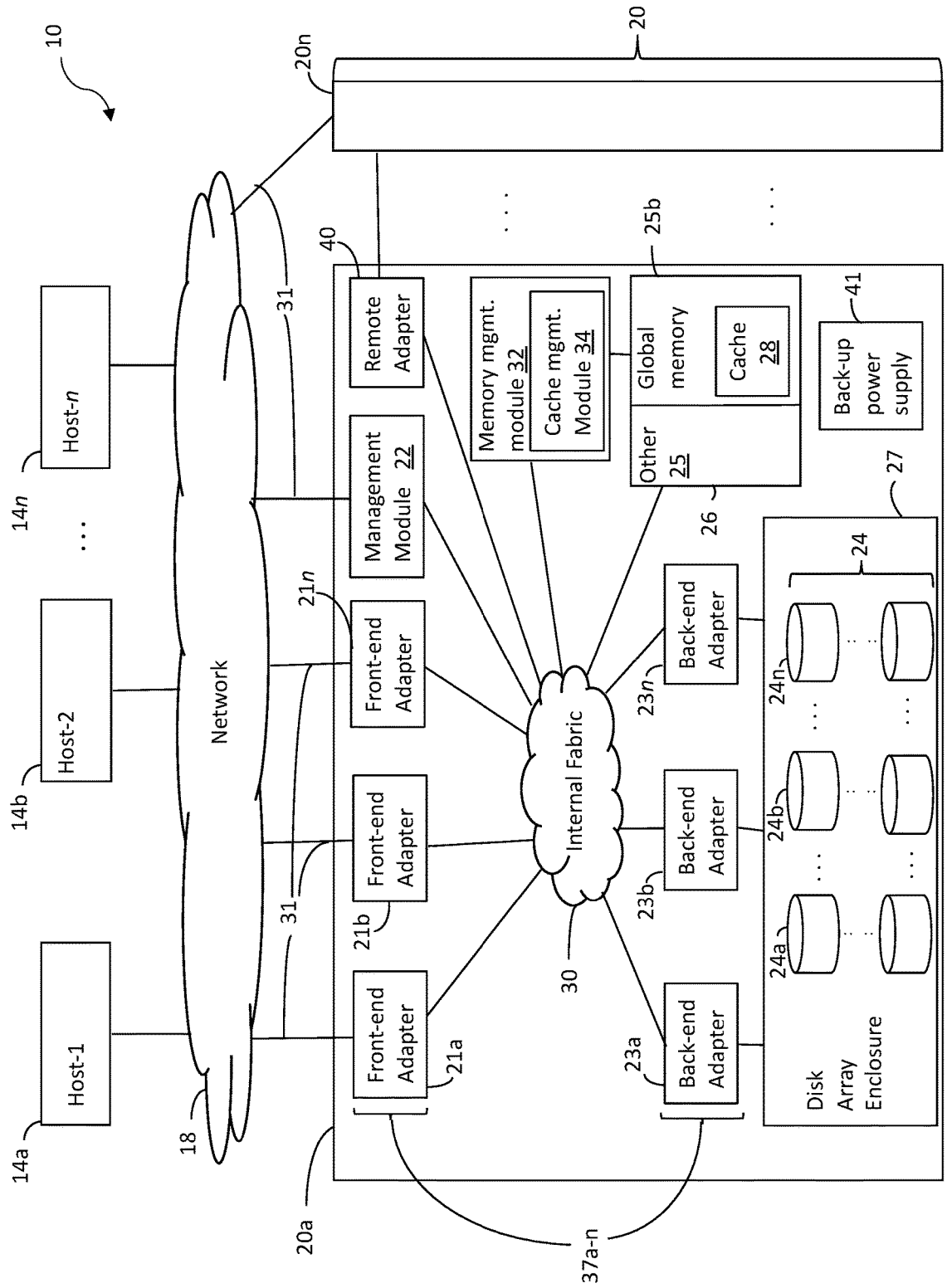
FIG. 1 is a block diagram illustrating an example of a data storage network, according to embodiments of the invention.

Ports of various components of a data storage network, including but not limited to storage systems, host systems and switches, may include transceivers for transmitting and receiving I/O communications. Such transceivers may be hot-swappable modules such as, for example, small form-factor pluggable transceivers ("SFPs").

SFP failures may occur when the transmit (TX) or receive (RX) power levels become too low on the SFP. These failures may impact the performance of applications on the storage network, cause SCSI retries that result in additional bandwidth consumption that may result in congestion, and/or may result in a dead I/O path that network components refrain from using, which may cause further congestion and/or performance degradation on the remaining active I/O paths and may make one or more network resource inaccessible, at least temporarily.

A storage system is capable of monitoring the state of its own front-end ports (FEPs) that connect to other network components (e.g., host systems and other storage systems through switches) to determine when there are any issues with an FEP, including RX or TX power levels of its SFP being too low. If an issue with an FEP is detected on the storage system, the storage system can redirect I/O communications and refrain from using the FEP until the issue is resolved. However, the storage system may not have visibility into the state of other ports on a storage network on which the storage system resides, including the state of the RX or TX power levels of the SFPs of such ports. Thus, the storage system may send an I/O communication from an FEP it knows to be healthy, only to have the I/O communication dropped or held-up due to SCSI retries because of a failed or failing SFP along the I/O path of the communication. For example, the storage system, after not receiving an acknowledgement (ACK) that: an I/O communication was received at a target, and/or an I/O operation specified by the I/O communication was completed, may resend the I/O communication on the same I/O path and/or another I/O path, which results in a longer response time for the I/O operation in question and may cause more systemic network congestion and performance degradation.

What may be desirable is for a storage system to be able to take into account the state of SFPs along I/O paths between the storage system and other network components so that the storage system may avoid I/O paths having SFPs in an undesirable state (i.e., unhealthy SFPs).

Described herein are techniques and mechanisms for a storage system to determine the state of SFPs along I/O paths between the storage system and other network components, and to manage I/O communications between the storage system and other components on a storage network based on the determined SFP state information.

In some embodiments of the invention, a storage system may send one or more queries to a switch of a data storage network. The query may request the state information of transceivers within any port on any I/O path through the switch between the storage system and another component on the storage network, for example, a host system or another storage system. For example, the query may request values of Read Diagnostic Parameters (RDPs) for SFPs in accordance with a Fibre Channel specification, e.g., in accordance with an RDP Extended Link Service (ELS) request as defined by Fibre Channel Link Services-5. (FC-LS-5) developed by the INCITS Fibre Channel T11 Technical Committee of Accredited Standards Committee, and promulgated by the American National Standards Institute (ANSI).

The storage system may receive the requested transceiver state information in one or more responses from the switch, and manage I/O communications between the storage system and the other network component based on the received transceiver state information. The received state information may include, for each transceiver, values for any SFP RDPs, including an RX power level and/or a TX Power level for the transceiver, for example, as defined in FC-LS-5.

In some embodiments of the invention, one or more I/O paths between the storage system and the other network component may be determined from the state information, for example, based on port identifiers included in the query response(s) and I/O path information maintained on the storage system, e.g., in one or more of the data structures described herein. For each I/O path, the state information of each transceiver of each port on the I/O path may be analyzed to determine if a priority of any I/O path should be decreased or increased. For example, in some embodiments, the priority value of an I/O path may be a binary value (e.g., "healthy" (1) or "not healthy" (0)), whereas in other embodiments the priority value may be any of a number of priority values (e.g., "excellent" (5), "good" (4), "average" (3), "below average" (2), "poor" (1)) or a numerical score within a range (e.g., 0-10). The determined I/O paths then may be grouped (e.g., healthy or unhealthy) or ranked (e.g., 1-100) based on the priority values determined for the I/O paths.

The storage system may include logic (e.g., software, firmware, hardware and/or a combination thereof) configured to manage I/O communications between the storage system and the other network component based on these groupings or rankings. For example, the storage system may be configured to not send I/O communications on unhealthy I/O paths, or may give precedence to sending communications on I/O paths having healthier states, e.g., according to I/O path grouping or rank.

The state information of a transceiver may include a detected RX power level and/or a detected TX power level of the transceiver, and the analysis of the state information may include comparing the TX and/or RX power levels of the transceiver with predefined (e.g., by a vendor of the transceiver) TX and/or RX power thresholds, respectively. A transceiver may be considered unhealthy if one or both of the TX and RX power levels are below the TX or RX power thresholds, respectively. The priority value of an I/O path may be determined in any of a variety of ways. In embodiments of the invention in which a priority value is a binary value (e.g., healthy or unhealthy), the priority value may be "healthy" if all transceivers on the I/O path are determined to be heathy, and may be "unhealthy" if any one of the transceivers are determined to be "unhealthy" (e.g., based on comparison to power thresholds as described above and in more detail elsewhere herein).

Transceiver state queries may be sent to one or more storage systems according to a predefined schedule (e.g., periodically), and the priority value of an I/O path may change each time based on the analysis of the transceiver state information, which in turn may cause the management of I/O communications between the storage system and the other network component to be adjusted—autonomously or manually.

While embodiments of the invention are described herein with respect to TX power levels and/or RX power levels of a transceiver, it should be appreciated that the invention is not so limited, as any of a variety of other transceiver state information may be used, including but not limited to values for any SFP RDPs specified in FC-LS-5, and the use of such state information is intended to fall within the scope of the invention.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14*a-n* and the storage systems 20*a-n* included in the storage network 10 may be connected to the network 18 by any one of a variety of connections as may be provided and supported in accordance with the type of network 18. The processors included in the host computer systems 14*a-n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a-n* may issue an I/O request to the storage system 20*a* to perform an I/O operation. For example, an application executing on one of the host computers 14*a-n* may perform a read or write operation resulting in one or more I/O requests being transmitted to the storage system 20*a*.

Each of the storage systems 20*a-n* may be manufactured by different vendors and interconnected (not shown). Additionally, the storage systems 20*a-n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14*a-n*, for example, to the storage systems 20*a*-20*n*. It should be appreciated that the particulars of the hardware and software included in each of the components that may be included in the storage systems 20*a-n* are described herein in more detail, and may vary with each particular embodiment.

Each of the storage systems, such as 20*a*, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24*a-n*. In some embodiments, one or more physical storage devices (e.g., one of the rows 24*a-n* of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
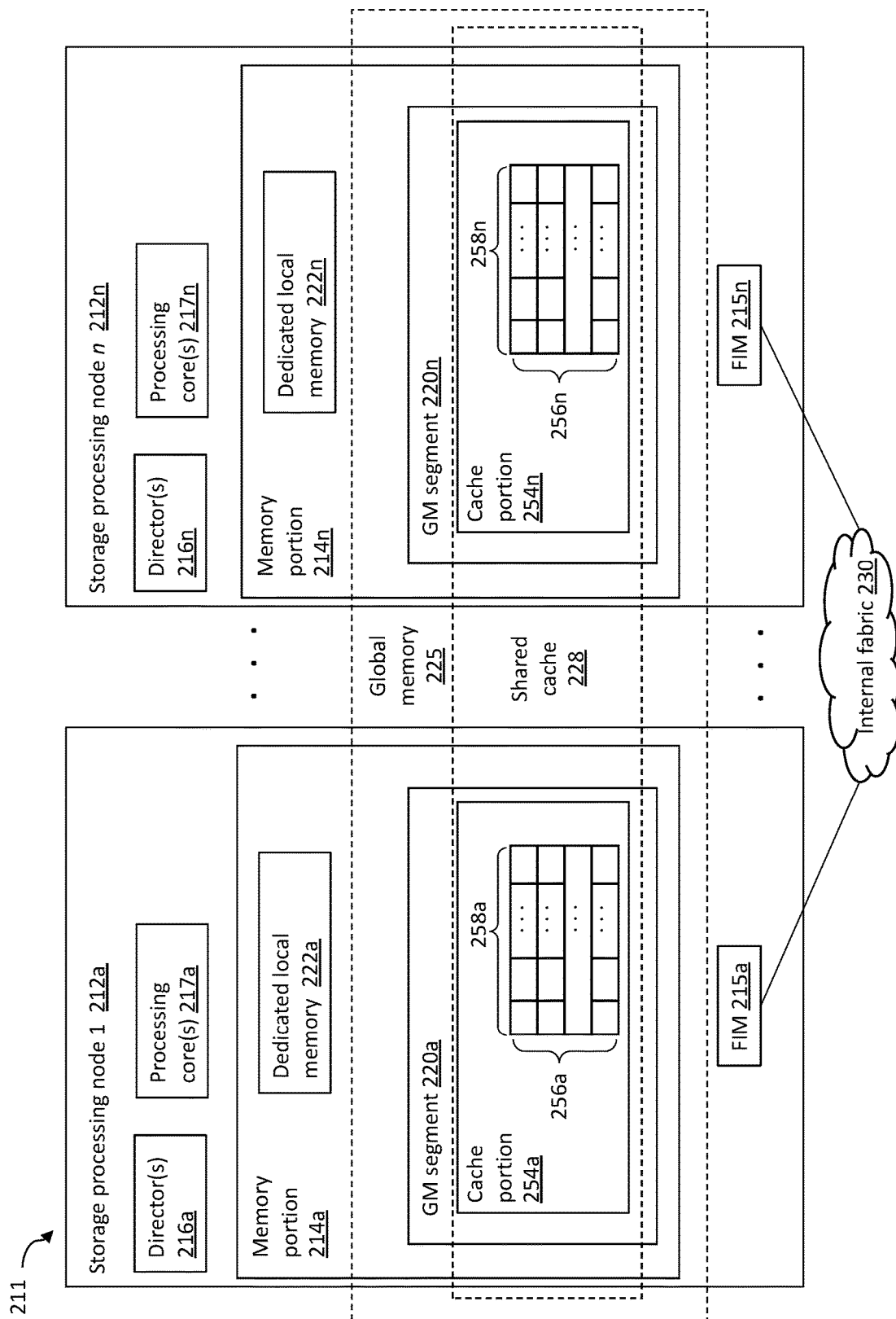
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
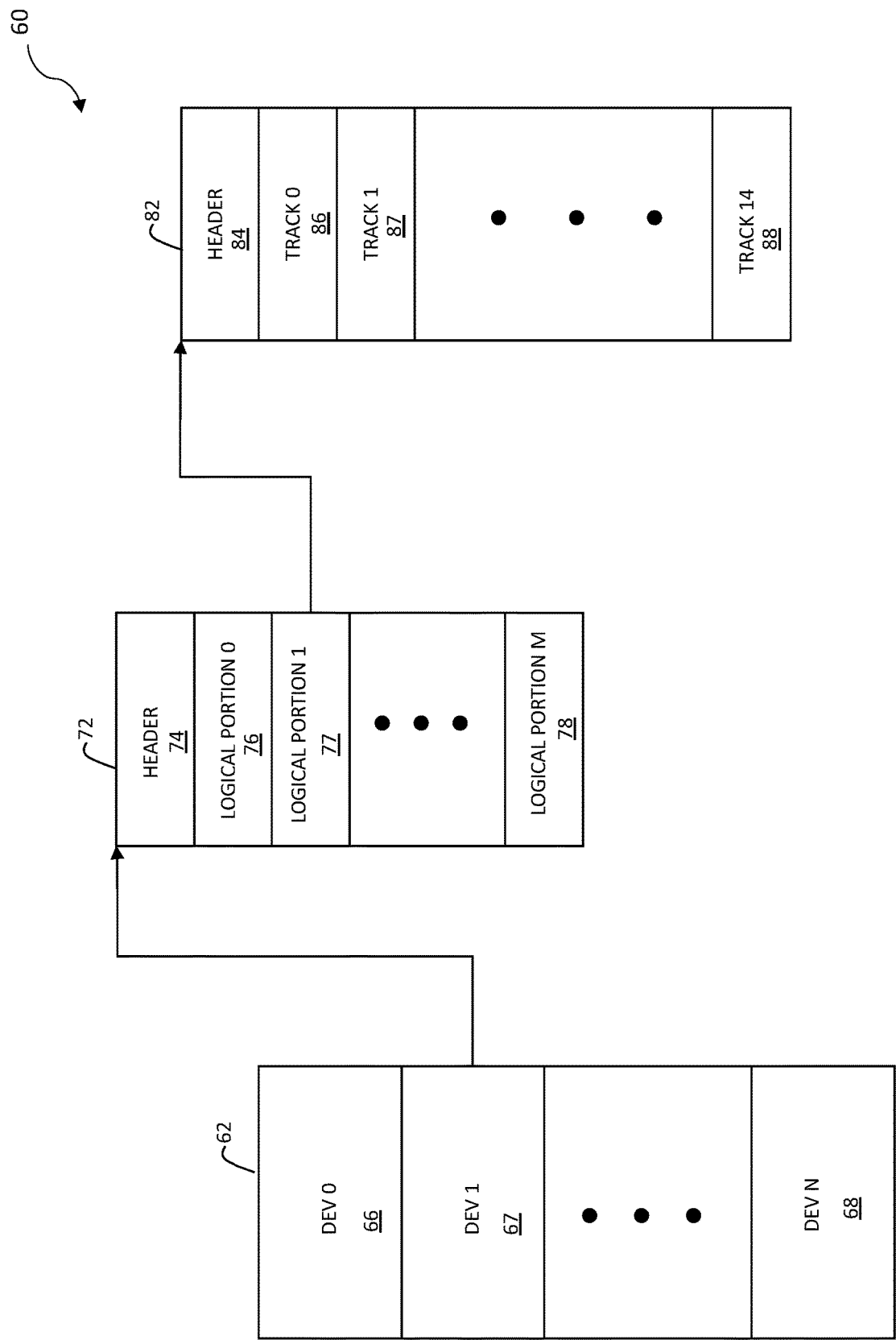
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82 and 300. Other data structures may be stored in any of GM 25*b*, memory 25*a*, GM segment 220*a*-*n* and/or dedicated local memories 22*a*-*n*.

Figure 5:
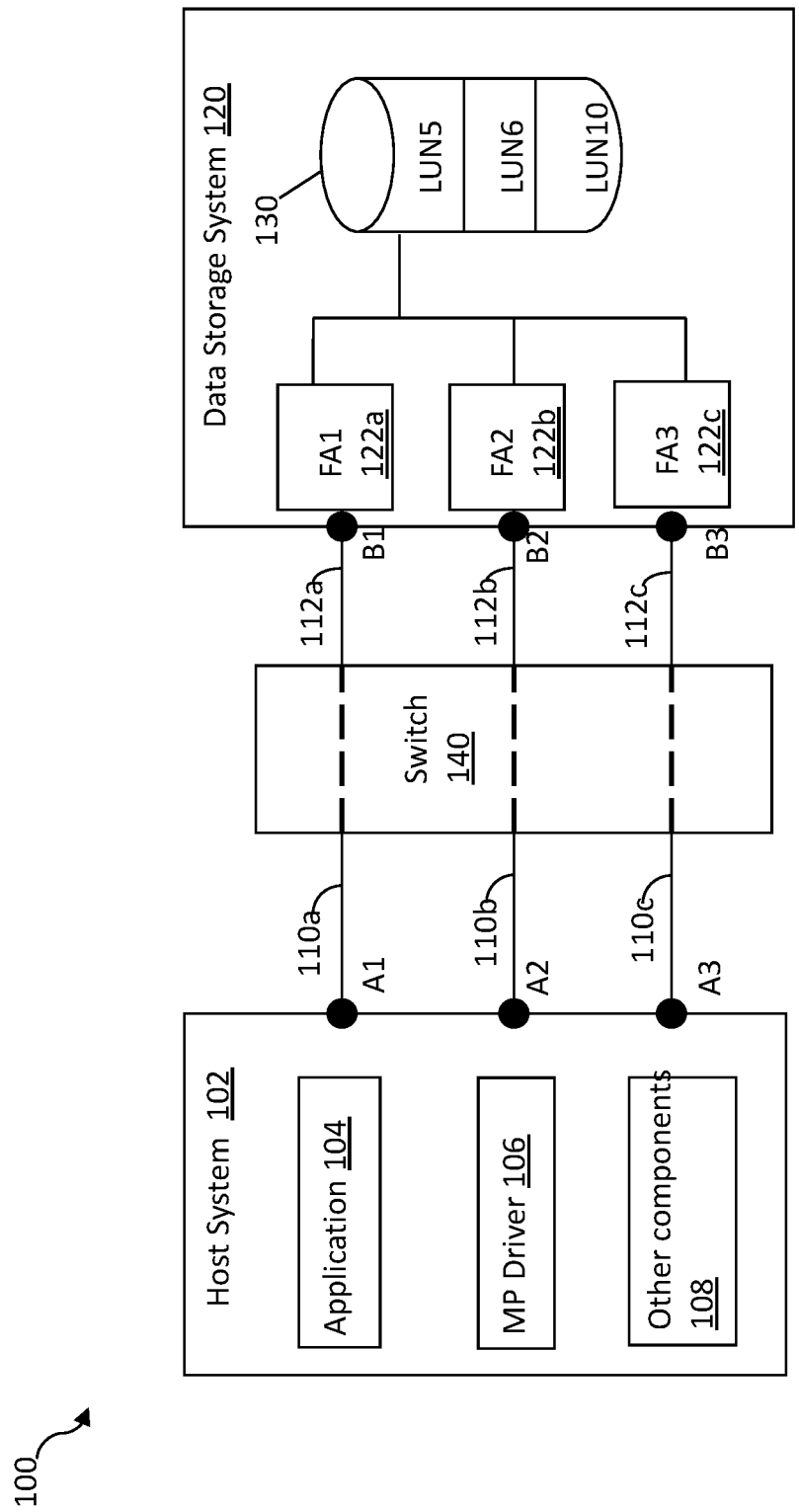
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20*a*-*n* and/or one or more hosts 14*a*-14*n*, or variation thereof.

The system 100 may include a host system 102, switch 140 and data storage system 120. The host system 102 and data storage system 120 may communicate over one or more I/O paths through the switch 140. Elements 110*a*-110*c* denote connections between the host system 102 and switch 140. Element 112*a*-112*c* denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters FA1, FA2 and FA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an FA of the data storage system 120. In the example of the system 100, elements A1, A2 and A3 each denote a port of a host system 102 (e.g., a port of an HBA), and elements B1, B2 and B3 each denote a port of an FA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an FA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an FA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an FA (e.g., such as B1-B3 of FIG. 5) in the data storage system. Through each such I/O path, one or more LSUs may be visible or exposed to the host system initiator through the target port of the data storage system.

Figure 7:
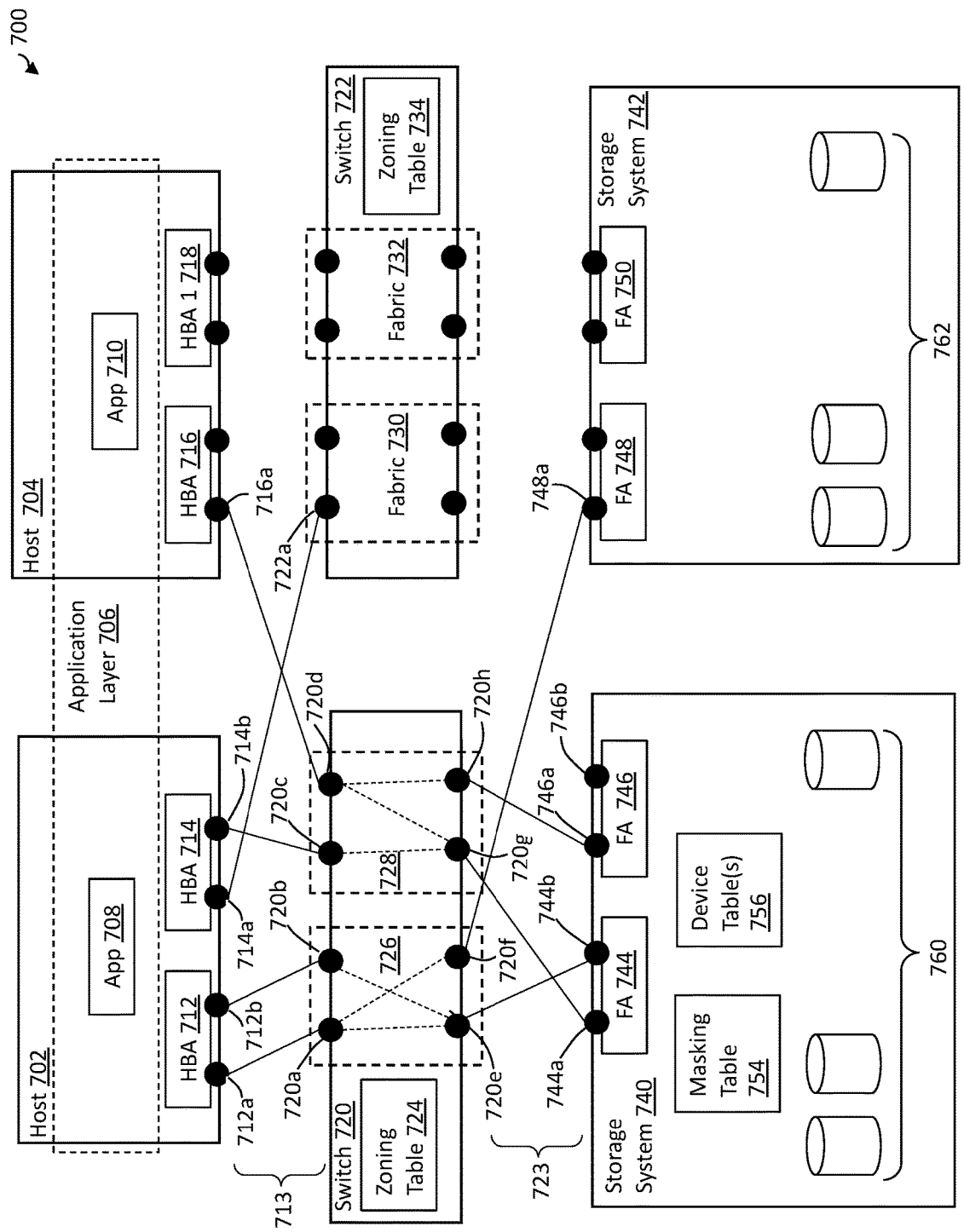
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712a, 712b, 714a and 714b. The portion of application layer 706 running on host 702 may include application 708 and one or more other applications. HBA 712 may include host ports 712a and 712b, and HBA 714 may include host ports 714a and 714b. HBAs 712 and 714 each may be separate discrete logical or physical components of host 702, and host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and SHP (e.g., in accordance with a technology standard (e.g., FC)) as illustrated in FIG. 7. That is, in some embodiments, each SHP is dedicated to one host port. FIG. 7 illustrates host ports 712a, 712b, 714a, 714b and 716a connected to SHPs over physical connections 713 in which there is only one physical connection 713 between each host port and each SHP.

Host 704 may include any of: a portion of the application layer at 706; application 710; HBAs 716 and 718; and multiple host ports including host port 716a of HBA 716.

Switch 720 may include any of: zoning table 724, fabrics 726 and 728; ports 720a-h; other components; or any suitable combination of the foregoing. Each of ports 720a-h ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7. That is, in some embodiments, each SSP is dedicated to an FEP. FIG. 7 illustrates FEPs 744a, 744b and 746a connected to SSPs 720g, 720a and 720h, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712a, 712b, 714a, 714b and 716a, are enabled to communicate with which FEPs, for example, 744a, 744b, 746a, 746b and 748a. Zoning tables are described in more detail elsewhere herein. The switch 720 may use the information in the zoning table 724 to determine the internal switch connections between SHPs and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which I/O connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

The switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

The storage system 740 may include any of: masking table 754; device table(s) 756; FAs 744 and 746; FEPs 744a, 744b, 746a and 746b; BEs (not shown); physical storage devices 760; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The storage system 742 may include any of the same or similar components as storage system 740, including FA 748 and FEP 748a thereof, physical storage devices 762, connectivity issue logic (not shown); and connectivity issue objects (not shown). In some embodiments, storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Other information, for example, a host ID of the host system on which the host port resides, the HBA of the host port, other information relating to the host port learned during host registration, the FA associated with the FEP, a processing node (e.g., director board) on which the FEP resides. Other information relating to the FEP, may be specified in column 808. A data structure other than a table, for example, a linked list and/or object-oriented data structure, may be used to record the same information.

To properly configure I/O connectivity between host ports, FEPs and LSUs, it may be necessary to know the permissible I/O paths between host ports and FEPs (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a fabric. Other information, for example, host, HBA, FA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a unique host ID (e.g., a host name), host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, which may include data structure 1000 described in more detail elsewhere herein. It should be appreciated that one or more of the data structures 62, 72, 72', 82, 800, 900 and 1000, or information contained therein, may be combined in one or more data structures, either as a variation of the one of the foregoing data structures or in a different data structure altogether.

In some embodiments of the invention, for a storage system and a network component (e.g., host system or other storage system) connected to each other by a fabric including one or more switches, for each of a plurality of I/O paths through one of the switches, a priority value of the I/O path may be determined based on transceiver state information for transceivers of the plurality of ports on the I/O path.

FIG. 10 is a block diagram illustrating an example of a data structure 1000 for maintaining I/O path priority values, according to embodiments of the invention. Other embodiments of a data structure for maintaining I/O path priority values, for example, variations of the data structure 1000, are possible and are intended to fall within the scope of the invention. The data structure 1000 may be referred to herein as an "I/O Path Priority table" or "IPT."

The IPT 1000 may include a plurality of entries 1010, each entry representing an I/O path between the storage system and a network component. Each entry may include a network component ID in a network component column 1001. The component ID may have been determined based on a network component port ID (e.g., a WWN), which may have been determined in response to querying a switch connecting the storage system and the network component, as described in more detail elsewhere herein. In some embodiments, the network component ID may have been derived (e.g., calculated) from a network component port ID, or determined from mapping the network component port ID to the network component ID using one or more data structures on the storage system that associate network port IDs to network component IDs. In a case in which the network component is a host system, the network component ID may be a host ID (e.g., host name), which may have been determined during the host registration process, associated with the port IDs of one or more host ports of the host system, and maintained in one or more other data structures on the host (e.g., a masking table 800, log-in table or other data structure). In some embodiments, there may be a separate IPT for each network component in I/O communication with the storage system, in which case there may be no column 1001, and the IPT 1000 may have a header or other field in which an ID of the network component is specified.

Each entry 1010 of the IPT 1000 may include an ID (e.g., WWN) of the interface port of the I/O path represented by the entry in an interface port column 1002, which may be an FEP or a port of a remote adapter (e.g., RA 40), which may be referred to herein as a "remote adapter port" or "RAP." Each entry 1010 also may include an ID (e.g., WWN) of the network component port of the I/O path represented by the entry in a network component port column 1004.

Each entry 1010 may include a priority value determined for the I/O path represented by the entry in priority value column 1006, which may have been determined based on transceiver state information of transceivers of ports included in the I/O path, as described in more detail elsewhere herein. Each entry 1010 also may include other information associated with the I/O path represented by the entry in one or more other columns (e.g., other info column 1008). Such other information may include any information associated with the I/O path described herein, for example, the port IDs of any ports included in the I/O path and information associated therewith. Information associated with such a port may include detected transceiver state information, TX and RX power thresholds, and may include a health score of the transceiver.

A health score of a transceiver may be based on one or more pieces of state information and/or the comparison for such pieces to one or more thresholds. For example, in some embodiments, a health score of a transceiver may be a binary value, e.g., "healthy" or "unhealthy." For example, a health score of a transceiver may be "healthy" if: a TX power level of the transceiver is greater than a TX power level threshold, and an RX power level of the transceiver is less than an RX power level threshold; and may be "unhealthy" if: the TX power level of the transceiver is less than the TX power level threshold, and an RX power level of the transceiver is less than an RX power level threshold. In other embodiments, the health score may be any of a number of values (e.g., "excellent" (5), "good" (4), "average" (3), "below average" (2), "poor" (1)) or a numerical score within a range (e.g., 0-10), for example, based on: the TX power level value, the RX power level value, the TX power level value relative to the RX power level threshold, and/or the RX power level value relative to the RX power level threshold.

The information that may be included in the IPT 1000 as described herein may be maintained in one or more other data structures in addition to, or as an alternative to, the IPT 1000, which may be derived from, or completely independent of, the IPT 1000. For example, one or more pieces of such information may be stored in a masking table (e.g., 800) or a zone table (e.g., 900). Further, one or more indexes may be derived from the IPT 1000, in which one or more pieces of information described in relation to the IPT 1000 may be an index key.

In some embodiments, each entry 1010 may include a time stamp value indicating a time at which the information was last updated, and the IPT 1000 may maintain historical information for each I/O path, and/or one or more other data structures may be maintained to record historical I/O path value information, including historical transceiver state information for one or more transceivers on each I/O path.

The information included in the IPT 1000 may be used to manage I/O communications on I/O paths for the storage system, including, for example, refraining from sending I/O communication on one or more I/O paths or giving precedence to I/O paths over other I/O paths when selecting I/O paths for I/O communications, as described in more detail elsewhere herein.

Figure 11:
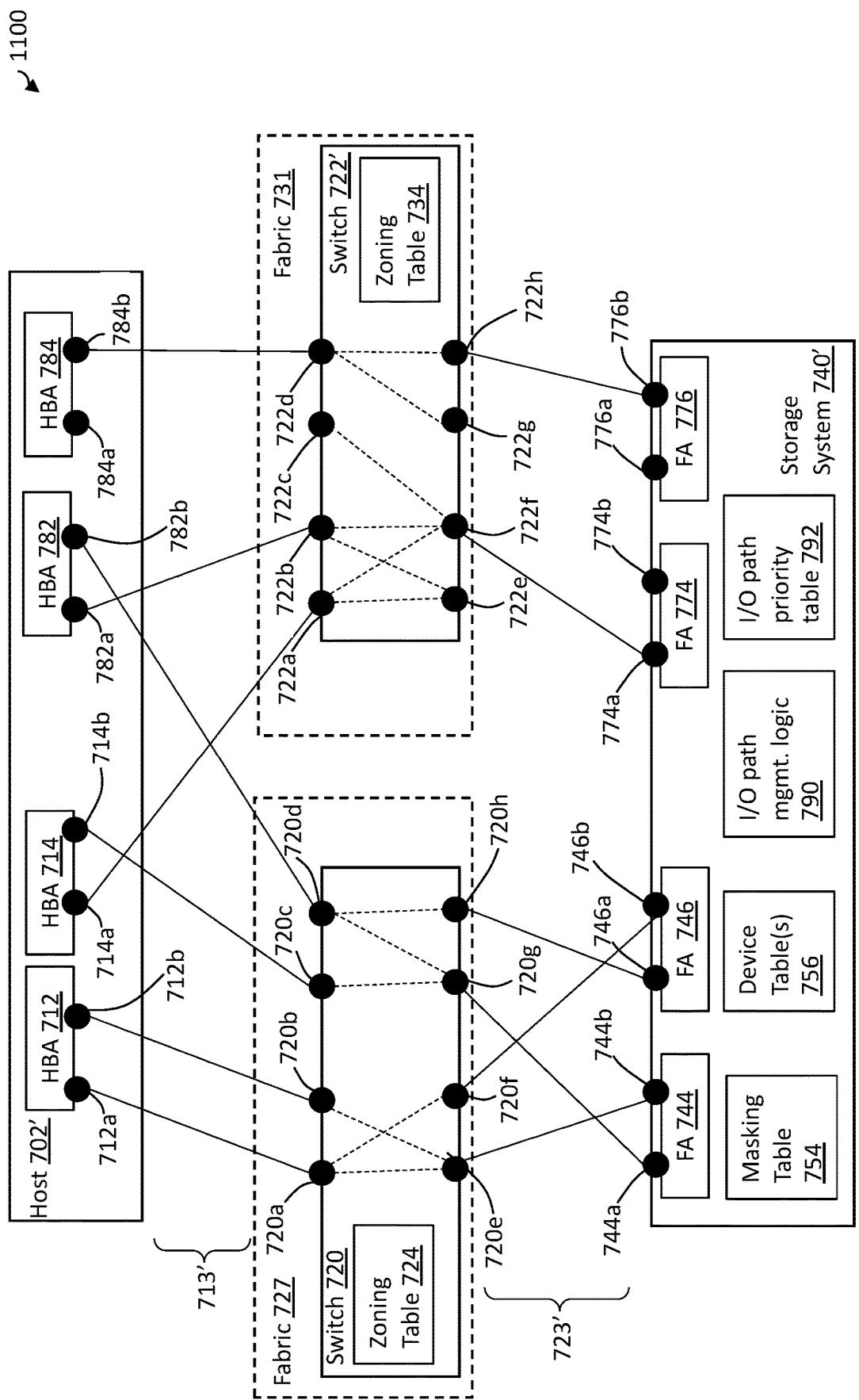
FIG. 11 is a block diagram illustrating an example of a storage network for managing I/O communications based on port transceiver state information, according to embodiments of the invention.

FIG. 11 is a block diagram illustrating an example of a storage network 1100 for managing I/O communications based on port transceiver state information, according to embodiments of the invention. Other embodiments of a storage network for managing I/O communications based on port transceiver state information, for example, variations of the storage network 1100, are possible and are intended to fall within the scope of the invention. The storage network 1100 may be a variation of the storage network 700, modified to manage I/O communications based on port transceiver state information. Elements that appear in both FIGS. 7 and 11, may not be described again in relation to FIG. 11, in which case such elements are the same as described in relation to FIG. 7.

FIG. 11 illustrates an embodiment of the invention in which I/O communications between the storage system 740' and the host system 702' are managed based upon transceiver state information of the transceivers of ports on I/O paths between the storage system 740' and the host system 702' across physical connections 723', switches 720 and 722' of fabrics (e.g., VSANs) 727 and 731 and physical connections 713'. However, it should be appreciated that, in other embodiments, there also may be a plurality of I/O paths between remote adapter ports (RAPs; not shown) of the storage system 740' and another storage system (not shown) or other type of network component. These I/O paths may be across either of switches 720 and 722' or another switch, from the RAPs of the storage system 740' to RAPs of the other storage system. In such embodiments, the same or similar techniques and mechanisms described herein in relation to managing I/O communications between the storage system 740' and the host system 702' may be applied to managing I/O communications between the storage system 740' and the other storage system.

System 1100 may include any of: a host 702'; switches 720 and 722'; a storage system 740'; physical connections 713' and 723', other components; or any suitable combination of the foregoing. It should be appreciated that, while only one host 702' is shown, system 1100 may have a plurality of hosts, perhaps including tens, hundreds or even thousands more. The host 702' may be a physical host system or virtual system as part of a virtualized environment, and may be part of a host cluster and/or distributed across multiple physical devices and/or part of a cloud environment. The host 702' may be a host system 102 described in relation to FIG. 5 or include any of the components thereof described herein.

The host 702' may include any of: HBAs 712, 714, 782 and 784; and host ports 712a, 712b, 714a, 714b, 782a, 782b, 784a and 784b. The HBA 712 may include host ports 712a and 712b; the HBA 714 may include host ports 714a and 714b; the HBA 782 may include host ports 782a and 782b; and the HBA 784 may include host ports 784a and 784b. HBAs 712, 714, 782 and 784 each may be separate discrete logical or physical components of host 702', and host 702' may include more or less than the four HBAs illustrated. Each of the host ports 712a, 712b, 714a, 714b, 782a, 782b, 784a and 784b may be connected to a switch port of switch 720 or 722' (each such switch port referred to herein as a "switch host port," "SHP" or "fabric port") by physical connections 713', which may be referred to herein as "host port links." Each such physical connection 713' may be a cable and, in some embodiments, there is only enabled one physical connection between each host port and SHP (e.g., in accordance with a technology standard (e.g., FC)) as illustrated in FIG. 11. That is, in some embodiments, each SHP is dedicated to one host port. FIG. 11 illustrates host ports 712a, 712b, 714a, 714b, 782a, 782b, 784a and 784b connected to SHPs over physical connections 713' in which there is only one physical connection 713' between each host port and each SHP.

The switch 722' may include any of: zoning table 734, ports 722a-h; other components; or any suitable combination of the foregoing. The switch 722' may be a switch 140 described in relation to FIG. 5 or include any of the components thereof described herein. In some embodiments, the switch 722' may be a Dell EMC Connectrix™ switch or director made available by Dell EMC. The zoning table 734 may be a data structure that defines which host ports (as defined by a unique identifier such as a WWN), e.g., which of host ports 712a, 712b, 714a, 714b, 782a, 782b, 784a and 784b, are enabled to communicate with which FEPs, for example, 744a, 744b, 746a, 746b, 774a, 774b, 776a and 776b. The switch 722' may use the information in the zoning table 734 to determine the internal switch connections between SHPs and SSPs to implement the defined zones, as illustrated by the dashed lines within switch 722' in FIG. 11. The zoning table 734 or another data structure on switch 722' may define one or more fabrics, including fabric 731, for example, by specifying the switch ports that are members of the fabric.

While not illustrated in FIG. 11, it should be appreciated that there may be multiple switches connected between a host port of the host system 702' and an FEP of the storage system 740'. For example, for an I/O path including FEP 774a, SSP 722f, SHP 722b and host port 782a, there may be one or more other switches connected between the SHP 722b and the host port 782a, such that I/O path includes two or more additional switch ports. In such embodiments, the switch directly connected to the storage system 740'—i.e., the switch 722'—may be a more powerful, larger capacity switch than the other one or more switches between the switch 722' and the host system 702', and the switch 722' may be considered a core switch.

The storage system 740' may include any of: masking table 754; device table(s) 756; FAs 744, 746, 774 and 776; FEPs 744a, 744b, 746a, 746b, 774a, 774b, 776a and 776b; RAs (not shown); RAPs (not shown); BEs (not shown); physical storage devices 760 (not shown); I/O path management logic 790 and IPT 792; other components; and any suitable combination of the foregoing. Device table(s) 756 may define properties of LSUs of the storage system 740', including logical devices (which may include thin devices) corresponding to the physical storage devices, as described in more detail elsewhere herein. The masking table 754 may define which host ports (e.g., 712a, 712b, 714a, 714b, 782a, 782b, 784a, 784b) are permitted to communicate with which LSUs over which FEPs (e.g., 744a, 744b, 746a, 746b, 774a, 774b, 776a, 776b). Masking tables are described in more detail elsewhere herein.

The storage system 740' may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

The storage system 740' also may include data structures that define I/O connectivity (e.g., permitted I/O paths) between a storage system and another storage system, for example, for use in providing any of a variety of data services, including but not limited to remote replication, data backup, data migration and storage tiering. Such I/O connectivity may be defined in terms of RAPs of the storage system and RAPs of other storage systems; i.e., which ports (RAPs) of the storage system are permitted to perform I/O communications with which ports (RAPs) of another storage system. In some embodiments, the storage system 740' may include an IPT 792, which may be implemented as the IPT 1000.

Figure 12:
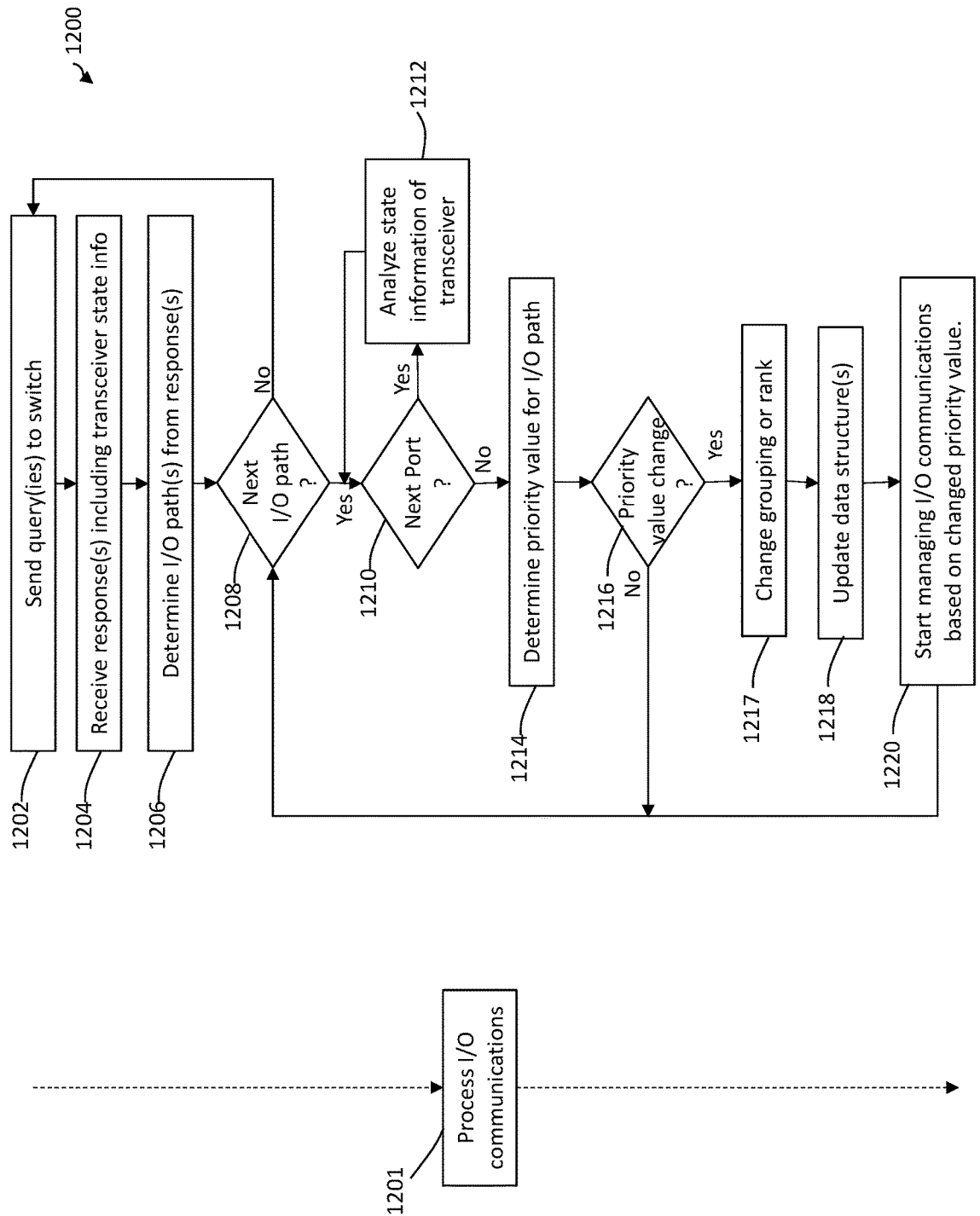
FIG. 12 is a block diagram illustrating an example of a method of managing I/O communications based on port transceiver state information, according to embodiments of the invention.

The I/O path management logic 790 may be implemented as software, firmware, hardware or a suitable combination thereof configured to manage I/O paths on the storage network 1100 based on transceiver state information of the ports on the I/O paths, for example, as described in relation to the method 1200 in connection with FIG. 12. The I/O path management logic 790 may be configured to access the I/O path priority table 792, and other data structures on the storage system 740', including the masking table 754 and the one or more device tables 756, as part of managing I/O paths as described herein. The I/O path management logic 790 may be implemented as part of a director and/or a management module described in more detail elsewhere herein.

FIG. 12 is a block diagram illustrating an example of a method 1200 of managing I/O communications based on port transceiver state information, according to embodiments of the invention. Other embodiments of a method of managing I/O communications based on port transceiver state information, for example, variations of the method 1200, are possible and are intended to fall within the scope of the invention.

In a step 1202, one or more queries may be sent from a storage system to a switch, for example, from an FEP (e.g., any of those illustrated in FIG. 11) or a RAP of the storage system (e.g., 740') to an SSP (e.g., any of those illustrated in FIG. 11) of the switch 720 or 722'). Each such query may request state information of transceivers within any port on any I/O path through the switch between the storage system and another component on the storage network, for example, a host system (e.g., the host system 702') or another storage system. For example, each query may request values of Read Diagnostic Parameters (RDPs) for SFPs in accordance with a Fibre Channel specification, for example, FC-LS-5.

In a step 1204, one or more responses to the one or more queries may be received from the switch at the storage system, for example at the FEP or SAP that sent the one or more requests. The responses(s) may include transceiver state information of transceivers within any port on any I/O path through the switch between the storage system and the storage network component. The received state information may include, for each transceiver, values for any SFP RDPs, including an RX power level and/or a TX Power level for the transceiver, for example, as may be defined in FC-LS-5.

In a step 1206, one or more I/O paths between the storage system and the other network component may be determined, for example, those illustrated in FIG. 11, including, but not limited to: an I/O path defined to include FEP 744a, SSP 720e, SHP 720b and host port 712b; an I/O path defined to include FEP 746a, SSP 720h, SHP 720d and host port 782b; and an I/O path defined to include FEP 77ba, SSP 722h, SHP 722d and host port 784b, to name just a few. I/O paths may be determined based on port identifiers included in the query response(s) and I/O path information maintained on the storage, for example, in one or more of the data structures described herein. Determining I/O paths may include comparing the port identifiers (e.g., WWNs) in the query responses to entries in a masking table (e.g., 754), I/O path priority table (e.g., 792) or other data structures.

In a step 1208, it may be determined whether there is a next I/O path from the one or more I/O paths determined in the step 1206. If there are any I/O paths determined in the step 1206, then, on a first pass through the performance of the steps 1208-1222 following the performance of the step 1206, it should be determined in the step 1208 that there is a next I/O path—i.e., a first I/O path of the one or more I/O paths determined in the step 1206.

If it is determined in the step 1208 that there is not a next I/O path from among the I/O paths determined in the step 1206—i.e., all I/O paths determined in the step 1206 have been considered, then the method 1200 may end or return to the step 1202 to repeat performance of the method 1200. In some embodiments, a storage system or another storage network component may be configured to perform the method 1200 in response to an event, for example, user input, or as part of a response to a system failure or scheduled system reboot. In some embodiments, performance of the method 1200 may be prescheduled, for example, to be performed periodically.

If it is determined in the step 1208 that there is a next I/O path from among the I/O paths determined in the step 1206, then, in a step 1210, it may be determined whether there is a next port from among the ports of the current I/O path being considered for which the steps 1212 has not yet been performed. If there is such a port, then, in a step 1212, the state information of the transceiver of the port may be analyzed. The state information of a transceiver may include a detected RX power level and/or a detected TX power level of the transceiver, and the analysis of the state information may include comparing the TX and/or RX power levels of the transceiver with predefined (e.g., by a vendor of the transceiver) a TX power threshold, and/or an RX power threshold, respectively.

As part of analyzing the transceiver state information, a transceiver health score may be determined. A health score of a transceiver may be based on one or more pieces of state information and/or the comparison for such pieces to one or more thresholds. For example, in some embodiments, a health score of a transceiver may be a binary value, e.g., "healthy" or "unhealthy." For example, a health score of a transceiver may be "healthy" if: a TX power level of the transceiver is greater than a TX power level threshold, and an RX power level of the transceiver is greater than an RX power level threshold; and may be "unhealthy" if: the TX power level of the transceiver is less than the TX power level threshold, or an RX power level of the transceiver is less than an RX power level threshold. In other embodiments, the health score may be any of a number of values (e.g., "excellent" (5), "good" (4), "average" (3), "below average" (2), "poor" (1)) or a numerical score within a range (e.g., 0-10), for example, based on any combination of: the TX power level value, the RX power level value, the TX power level value relative to the RX power level threshold, the RX power level value relative to the RX power level threshold, and any other transceiver state information and comparisons of same to predefined thresholds.

In some embodiments of the invention, the analysis of the state information of the transceiver is performed as part of a step 1214, and the step 1212 is limited to recording the port ID, transceiver state information and perhaps other information associated with the port.

If it is determined in the step 1208 that there is not a next port on the current I/O path determined in the step 1208—e.g., that the step 1212 has been performed for all ports on the current I/O path being considered, then a priority value for the current I/O path being considered may be determined in a step 1214. For example, the priority value of an I/O path may be a binary value (e.g., "healthy" (1) or "not healthy" (0)), or the priority may be any of a number of priority values (e.g., "excellent" (5), "good" (4), "average" (3), "below average" (2), "poor" (1)) or a numerical score within a range (e.g., 0-10). The priority value of an I/O path may be determined in any of a variety of ways. In embodiments of the invention in which a priority value is a binary value (e.g., healthy or unhealthy), the priority value may be "healthy" if all transceivers on the I/O path are determined to be heathy, and may be "unhealthy" if any one of the transceivers on the I/O path are determined to be "unhealthy" (e.g., based on comparison to power thresholds as described above and in more detail elsewhere herein).

In some embodiments, for example, when transceiver health scores are not binary, the priority value of an I/O path may be determined by combining the health scores of the transceivers of the ports included in the I/O path in any of a variety of ways, for example, by taking an average of the transceiver health scores. The determined I/O path priority values in such embodiments may be: a binary value (e.g., "healthy" or "unhealthy"), e.g., if the value of the combined health scores is greater than a predetermined threshold; classified as one of several values (e.g., any of those value described herein) based on the value of the combined health scores; or may be a numerical score (e.g., the value itself of the combined health scores) within a predefined range.

In a step 1216, it may be determined whether the priority value of the I/O path has changed since a last time it was determined. For example, in some embodiments it may be determined whether a binary value of the priority value—e.g., "healthy" or "unhealthy"—has changed. If it is determined that the priority value has not changed, the method may return to the step 1208. In some embodiments, a first-ever performance of the steps 1210-1220 results in a changed priority value, as previously there was not any priority value for the I/O path.

If it is determined in the step 1216 that the priority value has changed, then a group or rank of the current I/O path being considered may be changed (e.g., from "unhealthy" to "healthy"; "good" to "poor"; $7^{th}$ to $4^{th}$). In a step 1218, one or more data structures (e.g., 1000 or 792) may be updated. For example, an entry 1010 representing the I/O path in the IPT 1000 may be updated with an updated I/O path value, current transceiver state information and other information. Further, if a new I/O path is discovered, a new entry 1010 may be added to the table, and it is determined that an I/O path has been removed, for example, by physical change to the storage network or the updating of a zoning table, an entry representing the I/O path may be removed from the IPT 1000.

In a step 1220, management of the I/O communications on the one or more I/O paths considered in method 1200 based on the changed priority value (e.g., based on a changed grouping or ranking) may be started. For example, an I/O path may be selected or not for I/O communications based on the changes I/O path value. For example, if the priority value changed from "healthy" to "unhealthy," then I/O communication may be prevented from being sent on the I/O path, e.g., until the I/O path becomes healthy again. Conversely, if the priority value for an I/O path changed from "unhealthy" to "healthy," then I/O communication may be resumed on the I/O path. In other embodiments, the precedence of the I/O path for I/O communications may be increased or decreased based on its changed grouping or rank.

It should be appreciated that the steps 1202-1218 of the method 1200 may be performed concurrently to the change in I/O management in the step 1220, and that method 1200 may be performed concurrently to the ongoing processing of I/O operations (1201).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 1200 or parts thereof, may be implemented using one or more of the systems and/or data structures described in relation to FIGS. 1-11 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a storage system, a switch and one or more other network components, a method comprising:

for a first network component of the one or more other network components, sending at least one query from the storage system to the switch, the query requesting, for each of a first plurality of ports on one or more I/O paths that include the switch between the storage system and the first network component, state information about a state of an associated one of a plurality of transceivers included within said each port;

receiving at least one response to the at least one query, the at least one response including, for each of the first plurality of the ports, the state information of said associated one of the plurality of transceivers included within said each port, wherein the state information includes for said each port a measured receiving power of said associated one of the plurality of transceivers included in said each port and a measured transmitting power of said associated one of the plurality of transceivers included in said each port; and managing I/O communications between the storage system and the first network component based on the state information, wherein there are a plurality of I/O paths between the storage system and the first network component and wherein each of the plurality of I/O paths includes one or more of the first plurality of ports, and wherein said managing is performed by the storage system and includes:

determining one of a plurality of health scores for each of the plurality of transceivers included in one of the first plurality of ports, wherein said one health score for said each transceiver is determined in accordance with at least one of the measured transmitting power of said each transceiver and the measured receiving power of said each transceiver;

determining one of a plurality of priority values for each of the plurality of I/O paths based at least in part upon one or more of the plurality of health scores associated with one or more of the plurality of transceivers of one or more of the first plurality of ports included in said each I/O path; and selecting a first of the plurality of I/O paths for communications in accordance with the plurality of priority values determined for the plurality of I/O paths.

2. The method of claim 1, wherein said determining one of a plurality of health scores for each of the plurality of transceivers includes:

for each of the plurality of transceivers, performing at least one comparison, the at least one comparison including comparing the measured receiving power of said each transceiver to a predefined receiving power threshold and/or comparing the measured transmitting power of said each transceiver to a predefined transmitting power threshold.

3. The method of claim 2, wherein each I/O path of the plurality of I/O paths includes two or more of the first plurality of ports, and wherein each of the plurality of I/O paths has an associated one of the plurality of priority values based at least in part on two or more of the plurality of healthy scores associated with two or more of the plurality of transceivers of the two or more ports of said each I/O path.

4. The method of claim 3, wherein the at least one query requests, for each of a second plurality of ports, including the first plurality of ports, between the storage system and a plurality of the one or more network components, including the first network component, state information about a state of a transceiver included within said each port, wherein the at least one response includes, for each of the second plurality of the ports, the state information of the transceiver included within said each port, and wherein said managing I/O communications between the storage system and the first network component includes determining that at least one of the plurality of I/O paths are between the storage system and the first network component, wherein the first I/O path is included in the at least one I/O path.

5. The method of claim 1, wherein the sending of the at least one query is repeated according to a predefined schedule resulting in repeatedly receiving at least one response, respectively, in response to the repeated at least one query, and wherein I/O communications between the storage system and the first network component are managed based on the state information included in the repeatedly received at least one response.

6. The method of claim 1, wherein said managing I/O communications between the storage system and the first network component includes:

preventing I/O communications from being sent on at least one I/O path from among the plurality of I/O paths based at least in part on the state information for each of the first plurality of the ports.

7. The method of claim 1, wherein the other network component is another data storage system.

8. The method of claim 1, wherein the state information includes values for small form-factor pluggable Read Diagnostic Parameters in accordance with a Fibre Channel specification.

9. A data storage system for a data storage network including the storage system, a switch and one or more other network components, the data storage system including executable logic that implements a method including:
    for a first network component of the one or more other network components, sending at least one query from the storage system to the switch, the query requesting, for each of a first plurality of ports on one or more I/O paths that include the switch between the storage system and the first network component, state information about a state of an associated one of a plurality of transceivers included within said each port;
    receiving at least one response to the at least one query, the at least one response including, for each of the first plurality of the ports, the state information of said associated one of the plurality of transceivers included within said each port, wherein the state information includes for said each port a measured receiving power of said associated one of the plurality of transceivers included in said each port and a measured transmitting power of said associated one of the plurality of transceivers included in said each port; and
    managing I/O communications between the storage system and the first network component based on the state information, wherein there are a plurality of I/O paths between the storage system and the first network component and wherein each of the plurality of I/O paths includes one or more of the first plurality of ports, and wherein said managing is performed by the storage system and includes:
        determining one of a plurality of health scores for each of the plurality of transceivers included in one of the first plurality of ports, wherein said one health score for said each transceiver is determined in accordance with at least one of the measured transmitting power of said each transceiver and the measured receiving power of said each transceiver;
        determining one of a plurality of priority values for each of the plurality of I/O paths based at least in part upon one or more of the plurality of health scores associated with one or more of the plurality of transceivers of one or more of the first plurality of ports included in said each I/O path; and
        selecting a first of the plurality of I/O paths for communications in accordance with the plurality of priority values determined for the plurality of I/O paths.

10. The data storage system of claim 9, wherein said determining one of a plurality of health scores for each of the plurality of transceivers includes:
    for each of the plurality of transceivers, performing at least one comparison, the at least one comparison including comparing the measured receiving power of said each transceiver to a predefined receiving power threshold and/or comparing the measured transmitting power of said each transceiver to a predefined transmitting power threshold.

11. The data storage system of claim 10, wherein each I/O path of the plurality of I/O paths includes two or more of the first plurality of ports, and wherein each of the plurality of I/O paths has an associated one of the plurality of priority values based at least in part on two or more of the plurality of healthy scores associated with two or more of the plurality of transceivers of the two or more ports of said each I/O path.

12. The data storage system of claim 11, wherein the at least one query requests, for each of a second plurality of ports, including the first plurality of ports, between the storage system and a plurality of the one or more network components, including the first network component, state information about a state of a transceiver included within said each port,
    wherein the at least one response includes, for each of the second plurality of the ports, the state information of the transceiver included within said each port, and
    wherein said managing I/O communications between the storage system and the first network component includes determining that at least one of the plurality of I/O paths are between the storage system and the first network component, wherein the first I/O path is included in the at least one I/O path.

13. The data storage system of claim 9, wherein the sending of the at least one query is repeated according to a predefined schedule resulting in repeatedly receiving at least one response, respectively, in response to the repeated at least one query, and
    wherein I/O communications between the storage system and the first network component are managed based on the state information included in the repeatedly received at least one response.

14. The data storage system of claim 9, wherein said managing I/O communications between the storage system and the first network component includes:
    preventing I/O communications from being sent on at least one I/O path from among the plurality of I/O paths based at least in part on the state information for each of the first plurality of the ports.

15. The data storage system of claim 9, wherein the state information includes values for small form-factor pluggable Read Diagnostic Parameters in accordance with a Fibre Channel specification.

16. For a data storage network including a storage system, a switch and one or more other network components, non-transitory computer-readable media having software stored thereon, the software comprising:
    executable code that, for a first network component of the one or more other network components, sending at least one query from the storage system to the switch, the query requesting, for each of a first plurality of ports on one or more I/O path that include the switch between the storage system and the first network component, state information about a state of an associated one of a plurality of transceivers included within said each port;
    executable code that receives at least one response to the at least one query, the at least one response including, for each of the first plurality of the ports, the state information of said associated one of the plurality of transceivers included within said each port, wherein the state information includes for said each port a measured receiving power of said associated one of the plurality of transceivers included in said each port and a measured transmitting power of said associated one of the plurality of transceivers included in said each port; and
    executable code that manages I/O communications between the storage system and the first network component based on the state information, wherein there are a plurality of I/O paths between the storage system and the first network component and wherein each of the plurality of I/O paths includes one or more of the first plurality of ports, and wherein the executable code that manages I/O communications further includes:
  executable code that determines one of a plurality of health scores for each of the plurality of transceivers included in one of the first plurality of ports, wherein said one health score for said each transceiver is determined in accordance with at least one of the measured transmitting power of said each transceiver and the measured receiving power of said each transceiver;
  executable code that determines one of a plurality of priority values for each of the plurality of I/O paths based at least in part upon one or more of the plurality of health scores associated with one or more of the plurality of transceivers of one or more of the first plurality of ports included in said each I/O path; and
  executable code that select a first of the plurality of I/O paths for communications in accordance with the plurality of priority values determined for the plurality of I/O paths.

17. The non-transitory computer-readable media of claim 16, wherein said executable code that determines one of a plurality of health scores for each of the plurality of transceivers includes:
  executable code that, for each of the plurality of transceivers, performs at least one comparison, the at least one comparison including comparing the measured receiving power of said each transceiver to a predefined receiving power threshold and/or comparing the measured transmitting power of said each transceiver to a predefined transmitting power threshold.

18. The non-transitory computer-readable media of claim 17, wherein each I/O path of the plurality of I/O paths includes two or more of the first plurality of ports, and wherein each of the plurality of I/O paths has an associated one of the plurality of priority values based at least in part on two or more of the plurality of healthy scores associated with two or more of the plurality of transceivers of the two or more ports of said each I/O path.

19. The non-transitory computer-readable media of claim 18, wherein the at least one query requests, for each of a second plurality of ports, including the first plurality of ports, between the storage system and a plurality of the one or more network components, including the first network component, state information about a state of a transceiver included within said each port,
  wherein the at least one response includes, for each of the second plurality of the ports, the state information of the transceiver included within said each port, and
  wherein said managing I/O communications between the storage system and the first network component includes determining that at least one of the plurality of I/O paths are between the storage system and the first network component, wherein the first I/O path is included in the at least one I/O path.

20. The non-transitory computer-readable media of claim 16, wherein the executable code that manages I/O communications between the storage system and the first network component includes:
  executable code that prevents I/O communications from being sent on at least one I/O path from among the plurality of I/O paths based at least in part on the state information for each of the first plurality of the ports.

* * * * *